Sept. 13, 1938.  A. L. SWIGART  2,129,885

ELECTRICAL CONVERTER SYSTEM

Filed Jan. 11, 1937

INVENTOR,
Arthur L. Swigart.
BY Hovey & Hamilton,
ATTORNEYS.

Patented Sept. 13, 1938

2,129,885

UNITED STATES PATENT OFFICE 2,129,885

ELECTRICAL CONVERTER SYSTEM

Arthur L. Swigart, Kansas City, Mo., assignor, by mesne assignments, to Grace M. Jones, Kansas City, Mo.

Application January 11, 1937, Serial No. 119,991

4 Claims. (Cl. 175—364)

This invention relates to an electrical converter system, and particularly to electrical systems for converting unidirectional current into alternating current.

The principal object of this invention is the production of an electrical converter system, wherein a unidirectional current is converted into a smooth, alternating current by means of a rotary mechanical converter in a circuit having especially constructed and positioned condenser and resistance elements, whereby the alternating current is smoothed out and the arcing of the brushes on the rotary converter is reduced to a minimum.

Another object of the present invention is the provision of an electrical converter system, wherein the flow of current from a unidirectional source is changed to an alternating current by a rotary mechanical converter and is controlled by means of a grounded choke coil and a condenser in series, connected with each of the leads from the unidirectional source to the converter.

A further object of the invention is to provide novel means for preventing arcing of the contacts of the interrupter.

Other objects and fuller understanding of this invention will be had by referring to the specification and the accompanying drawing, wherein.

Figure 3:
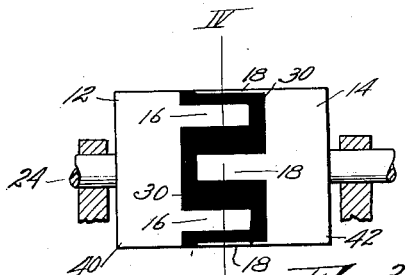
Fig. 3 is a longitudinal elevation of the converter.
Figure 4:
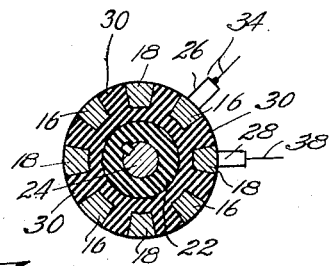
Fig. 4 is a cross sectional view, taken on line IV—IV of Fig. 3.

Referring now to the drawing, wherein like reference characters refer to similar parts, the numeral 10 designates a mechanical converter or commutator comprising insulated, rotatably mounted castings 12 and 14, having teeth 16 and 18 respectively interpositioned in overlapped, spaced-apart relation, as clearly shown in Figs. 3 and 4 of the drawing. The castings 12 and 14 are embedded in an insulator 30, made of a good insulating material such as mica, and mounted on an insulating sleeve 22, which in turn is rigidly carried on a shaft 24. This structure produces a cylindrical member concentrically mounted on shaft 24, with the teeth 16 and 18 in consecutive spaced-apart relation and overlapping a common circular band zone of the cylinder so that brushes 26 and 28 will successively contact the teeth as the cylinder is rotated. The width of insulation 30 between adjacent teeth is preferably about the same as the width of the teeth, while the width of the brushes 26 and 28 is less than the width of the teeth, thus making it impossible for the brushes to bridge across adjacent teeth during the operation of the device.

As shown in the diagrammatical view of the system, brush 26 is connected to one side 32 of the unidirectional current circuit by means of conductor 34, and the other side 36 of the unidirectional circuit is connected with brush 28 by a conductor 38. A switch 40' is provided in conductor 38. The brushes are preferably stationed so that when brush 26 is centered on one of the teeth 16, 28 will be centered on one of the teeth 18 and vice versa.

The outer cylindrical portions 40 and 42 for castings 12 and 14 respectively, serve as collector rings to conduct the current from their respective teeth to the primary coil 44 of transformer 46.

The brush 48 which contacts 40 is connected to one end of coil 44 by conductor 50, and brush 52 connects with the other end of primary coil 44 through conductor 54. It is apparent that, with the system just described, an alternating current will be set up in the primary coil, so that an alternating current of any desired voltage may be set up in the secondary coil 56 of the transformer which is connected to the load, such as a neon tube 58 by conductors 60 and 62. A laminated iron core 61 is provided in the transformer. The condenser 64 is connected in parallel with the primary coil 44 and serves to give a good smooth current flow to coil 44.

A condenser 66 is connected across conductors 34 and 50, while condenser 68 is connected across conductors 38 and 54. These condensers also serve to smooth out the converted current and to prevent to a certain degree the arcing at brushes 26 and 28.

To minimize further the arcing upon the interruption of the current at the brushes 26 and 28 and to facilitate the production of a smooth alternating current to the primary coil of the transformer, the following means is provided. Two choke coils 70 and 72 in direct electrical connection with condensers 74 and 76 respectively are connected in parallel with conductors 34 and 38 by means of conductors 78, 80, 82 and 84. Furthermore, the condensers 74 and 76 are provided with a common ground 86.

In explaining the operation of this invention, it is assumed that the switch 40 is closed and that the mechanical converter 10 is being rotated, by some external force not shown, at a rate of speed suitable to produce the proper rate of alternation of the current to the primary coil of the transformer. It is evident that the frequency of alternation may be varied by either changing the number of teeth on the mechanical converter or by altering the rate of speed of rotation thereof.

Figure 1:
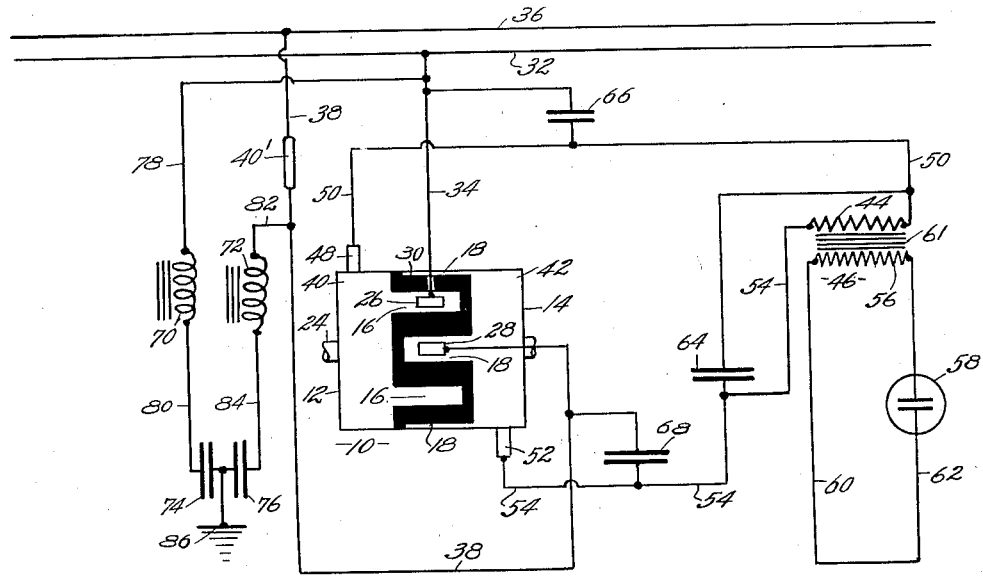
Figure 1 is a diagrammatical view of an electrical converter system embodying this invention.
Figure 2:
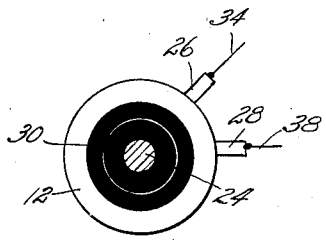
Fig. 2 is an end elevation of a converter or commutator used in the system.

When the parts are in the position shown in Fig. 1, current passes from the unidirectional conductor 32, through conductor 34, interrupter brush 26, tooth 16, ring 40, collector brush 48, conductor 50, primary coil 44, conductor 54, collector brush 52, ring 42, interrupter brush 28, conductor 38, thence to the other conductor 36 of the unidirectional source of current. As 10 is rotated through an arc sufficient to position the brushes on the adjacent teeth, brush 26 will be on one of the teeth 18 and brush 28 will be on one of the series of brushes 16, thus reversing the direction of flow through the primary coil of the transformer. This rate of change may be 120 cycles per second, or any other predetermined rate suitable for the particular kind of apparatus to be operated. When a neon tube is operated, the secondary current is stepped up to a relatively high voltage. When the brushes leave the tongues, there is a tendency to create an arc across the gap; however, this is partially overcome by the condensers 64, 66 and 68 which also serve to smooth out the current. As the brush changes are being made as described above, the current is further smoothed out by the choke coils 70 and 72, and the condensers 74 and 76. The choke coil 70 and condenser 74 are identical with choke coil 72 and condenser 76, and each series is grounded, thereby setting up like conditions to smooth out the current as the reversal of flow is set up in the transformer circuit.

By means of this system of converting unidirectional current into an alternating current, the change is made at an extremely low cost and with a minimum loss of current; also, a smooth current suitable for use in neon tube operation, etc.

What I claim is:

1. A system for converting unidirectional electric current into alternating current comprising a rotary mechanical converter having interrupter brushes and collector brushes; a transformer; conductors connecting the interrupter brushes of said converter with the two sides of a unidirectional current source; a grounded choke coil and a condenser disposed in series and connected respectively with each of said conductors to form a shunt across the unidirectional source, the midpoint of said shunt being grounded; conductors interconnecting said collector brushes with the terminals respectively of the primary coil of said transformer; and a condenser connected in parallel with said primary coil.

2. A system for converting unidirectional electric current into alternating current comprising a rotary mechanical converter having interrupter brushes and collector brushes; a transformer; conductors connecting the interrupter brushes of said converter with the two sides of a unidirectional current source; a grounded choke coil and a condenser disposed in series and connected respectively with each of said conductors to form a shunt across the unidirectional source, the midpoint of said shunt being grounded; conductors interconnecting said collector brushes with the terminals respectively of the primary coil of said transformer; a condenser connected in parallel with said primary coil; and a condenser in a conductor interconnecting the conductor from one of said interrupter brushes and the conductor to one of said collector brushes.

3. A system for converting unidirectional electric current into alternating current comprising a rotary mechanical converter having interrupter brushes and collector brushes; a transformer; conductors connecting the interrupter brushes of said converter with the two sides of a unidirectional current source; a grounded choke coil and a condenser disposed in series and connected respectively with each of said conductors to form a shunt across the unidirectional source, the midpoint of said shunt being grounded; conductors interconnecting said collector brushes with the terminals respectively of the primary coil of said transformer; a condenser connected in parallel with said primary coil; a condenser in a conductor interconnecting the conductor from one of said interrupter brushes and the conductor to one of said collector brushes; and a condenser in a conductor interconnecting the conductor from the other of said interrupter brushes and the conductor from the other of said collector brushes.

4. A system for converting unidirectional electric current into alternating current comprising a rotary mechanical converter having interrupter brushes and collector brushes; a transformer; conductors connecting the interrupter brushes of said converter with the two sides of a unidirectional current source; a grounded choke coil and a condenser disposed in series and connected respectively with each of said conductors to form a shunt across the unidirectional source, the midpoint of said shunt being grounded; conductors interconnecting said collector brushes with the terminals respectively of the primary coil of said transformer; and a condenser connected in parallel with said primary coil.

ARTHUR L. SWIGART.